(12) United States Patent
Snydmiller et al.

(10) Patent No.: US 9,669,340 B2
(45) Date of Patent: Jun. 6, 2017

(54) HYDROCARBONS ENVIRONMENTAL PROCESSING SYSTEM METHOD AND APPARATUS

(75) Inventors: Jason Craig Snydmiller, Calgary (CA); Stuart Allan Snydmiller, Calgary (CA)

(73) Assignee: David Robinson, Calgary (CA)

( * ) Notice: Subject to any disclaimer, the term of this patent is extended or adjusted under 35 U.S.C. 154(b) by 1086 days.

(21) Appl. No.: 13/811,380

(22) PCT Filed: Jul. 20, 2011

(86) PCT No.: PCT/CA2011/000820
§ 371 (c)(1),
(2), (4) Date: Jun. 28, 2013

(87) PCT Pub. No.: WO2012/009792
PCT Pub. Date: Jan. 26, 2012

(65) Prior Publication Data
US 2013/0270183 A1    Oct. 17, 2013

Related U.S. Application Data

(60) Provisional application No. 61/365,958, filed on Jul. 20, 2010.

(51) Int. Cl.
*B01D 11/00* (2006.01)
*B01D 21/00* (2006.01)
(Continued)

(52) U.S. Cl.
CPC ......... *B01D 36/00* (2013.01); *B01D 17/0214* (2013.01); *B01D 21/0003* (2013.01);
(Continued)

(58) Field of Classification Search
None
See application file for complete search history.

(56) References Cited

U.S. PATENT DOCUMENTS 4,477,353 A * 10/1984 Messer ................. B03D 3/06
                                                          209/5
4,645,608 A    2/1987 Rayborn
(Continued)

FOREIGN PATENT DOCUMENTS

| CA | 1297059 C  | 3/1992 |
| CA | 2317858 C  | 4/2008 |
| WO | 03031012 A1 | 4/2003 |

OTHER PUBLICATIONS

Hung, Chi Wing; International Search Report from corresponding PCT Application No. PCT/CA2011/000820; search completed on Nov. 3, 2011.

*Primary Examiner* — Richard Gurtowski
(74) *Attorney, Agent, or Firm* — Blake, Cassels & Graydon LLP; Brett J. Slaney

(57) ABSTRACT

A system, components of the system and methods for processing, combinations of hydrocarbons, water, solids and contaminants, to separate extract, recover, filter and treat the constituent elements to enable the recovery of valuable hydrocarbons, the treatment of solids for environmentally sustainable discharge, the filtration and treatment of water for reuse, or environmentally sustainable discharge, and the extraction of contaminants. The integrated method and system incorporates alternative processing modes, each of which is optimized for the intake and processing of a materials stream which is predominately solids, or predominately water or predominately hydrocarbons, respectively. The system can dynamically adjust to accommodate variations in the composition of the intake materials stream in any particular mode. The system can be implemented in a portable, modular configuration which is cost effective, energy efficient and scalable to enable processing of any volume of materials.

9 Claims, 11 Drawing Sheets

(51) Int. Cl.
  *C02F 1/00*    (2006.01)
  *B01D 36/00*   (2006.01)
  *B01D 17/02*   (2006.01)
  *C02F 9/00*    (2006.01)
  *B01D 21/32*   (2006.01)
  *C02F 1/24*    (2006.01)
  *C02F 1/38*    (2006.01)
  *C02F 1/40*    (2006.01)
  *C02F 1/56*    (2006.01)
  *C02F 11/00*   (2006.01)
  *C02F 101/32*  (2006.01)

(52) U.S. Cl.
  CPC ............... *C02F 9/00* (2013.01); *B01D 21/32* (2013.01); *B01D 2221/04* (2013.01); *B01D 2221/08* (2013.01); *C02F 1/24* (2013.01); *C02F 1/385* (2013.01); *C02F 1/40* (2013.01); *C02F 1/56* (2013.01); *C02F 11/002* (2013.01); *C02F 2101/32* (2013.01); *C02F 2201/007* (2013.01); *C02F 2209/006* (2013.01)

(56) References Cited

U.S. PATENT DOCUMENTS

| | | |
|---|---|---|
| 4,942,929 A | 7/1990 | Malachosky et al. |
| 5,755,892 A | 5/1998 | Herold et al. |
| 6,550,552 B1 | 4/2003 | Pappa et al. |
| 6,846,420 B2 | 1/2005 | Reddy et al. |
| 2009/0020458 A1 | 1/2009 | Bozak et al. |
| 2009/0078632 A1 | 3/2009 | Gallo et al. |
| 2009/0156877 A1 | 6/2009 | Newman et al. |
| 2010/0072110 A1* | 3/2010 | Gradek .................... C10G 1/04 208/390 |

* cited by examiner

HYDROCARBONS ENVIRONMENTAL PROCESSING SYSTEM METHOD AND APPARATUS

FIELD OF THE INVENTION

The present invention relates to a system, components of the system and methods for processing combinations of hydrocarbons, water, solids and contaminants, to separate the constituent elements and extract, recover, filter and treat any one or more of those constituent elements.

More specifically the present invention relates to a system, components of the system and methods for processing waste fluids, slurries and solids to enable the recovery of valuable hydrocarbons, the treatment of solids for environmentally sustainable discharge, the filtration and treatment of water for reuse, or environmentally sustainable discharge, and the extraction of contaminants.

Further the system may be a portable, modular, scalable, integrated system incorporating alternative processing modes, each of which is optimized for processing an intake stream which is predominately composed of solids, or water or hydrocarbons respectively and can dynamically adjust to accommodate variations in the composition of the intake stream.

BACKGROUND OF THE INVENTION

The oil and gas sector and general industry produce a variety of waste fluids, slurries and solids comprising combinations of hydrocarbons, water, solids and contaminants. Examples include:
  (a) Oil recovered from marine and land oil spills, combining water, salts, dispersant chemicals and solids,
  (b) Sand and soil which has been contaminated by an oil spill or hydrocarbon seepage, or contains oilsand bitumen,
  (c) Storage tank sludge combining residual hydrocarbons, chemicals, water and solids,
  (d) Drilling borehole cuttings combining solids, drilling fluids and produced hydrocarbons generated by drilling activities associated with gas, oil and oilsand bitumen production,
  (e) Water in tailings settlement ponds associated with oilsand bitumen mining production, combining mature fine tailings suspended solids, residual hydrocarbons, and chemicals,
  (f) Water recovered from industrial processes, including cutting machine lubrication fluids and car wash fluids, and
  (g) Surface wastewater recovered from drilling rigs, construction sites and refineries.

The management and disposition of these waste streams are subject to increasing environmental regulation. The nature and cost efficiency of management and disposition techniques adopted can adversely impact enterprise shareholder value. Examples include; increased operating costs for containment, management, transportation, processing and disposal, increased financial statement allocations to fund future clean up liability obligations and decreased levels of economically recoverable hydrocarbon asset reserves reported in financial statements, simply as a consequence of the type of engineering approach selected to comply with environmental regulations.

Current waste management and disposition techniques include transportation from the site of origin to a remote processing facility and disposal site and various alternative on-site processing methods.

Disadvantages of using waste management techniques based on transportation and disposal include:
  (a) Disposal Restrictions; Contaminated waste may be characterized by environmental regulations as hazardous waste, which precludes non-hazardous disposal options for large volumes of waste and requires expensive on-site containment and management arrangements,
  (b) Disposal Charges; Costs for off site processing and disposal of large volumes of contaminated waste,
  (c) Transportation Charges; Costs of transporting large volumes of waste long distances from remote locations to a processing plant facility and disposal site, often on poor, seasonally accessible roads with associated insurance costs and liability exposure in the event of accidental spillage, together with attendant increases in greenhouse gas generation from transportation diesel fuel combustion, and
  (d) Lost Value; The financial value of hydrocarbons associated with waste, including valuable oil, drilling fluids and lubricants, are lost upon disposal.

Disadvantages of using waste management techniques based on alternative processing methods include dependence on systems implementing alternative processes which require significant quantities of water and do not incorporate a closed loop for treatment and reuse of process water. The continued ability to source and use water in industrial processes is increasingly restricted by environmental regulations. In addition, hydrocarbon extraction activities are often conducted in agricultural, remote or arid locations where water is a scarce, contested and expensive commodity.

Additionally, systems implementing alternative processes are not sufficiently portable to enable transportation and operation at remote locations or rapid emergency deployment and relocation between temporary sites, Another drawback to existing systems implementing alternative processes is that they are not designed for continuous operation and are not sufficiently robust and reliable to enable uninterrupted operation under harsh conditions at remote locations, Systems implementing alternative processes are not cost efficient to operate in remote locations due to requirements for skilled human operators, supplies of consumable filters, maintenance services and consumption of expensive fuel and electricity.

In addition to the above limitations, systems implementing alternative processes can perform a limited specialized function, but are not a flexible, integrated system capable of fully processing a variety of different intake combinations of hydrocarbons, water, solids and contaminants in varying proportions, together with continuous treatment and reuse of process water.

Further still, alternative processes are subject to the following limitations:
  (a) Inability to demonstrate both adequate processing capacity in a portable configuration and scalability to significantly increased industrial capacities;
  (b) Limited capability to process hydratable solids and consequently can only resolve waste materials into a sludge or slurry containing residual hydrocarbons, and solids, but are not able to completely segregate hydrocarbons and water and render dry, neutral solids qualified for discharge to the environment in accordance with environmental regulations;

(c) Inability to resolve water to a condition qualified for discharge to the environment in accordance with environmental regulations;

(d) Alternative processes generate solids which remain contaminated with residual hydrocarbons or use inorganic polymers which affect the electrical conductivity properties of solids. Accordingly even after processing, large volumes of the solids generated remain characterized as hazardous waste and disqualified for non-hazardous disposal options;

(e) Alternative processes depend on the use of surfactant chemicals which build up a level of contamination in process water rendering it unsuitable for reuse in industrial processes due to the risk that exposure will cause deterioration in the seals in industrial plant equipment;

(f) Inability to prevent escalating levels of mineral salts which results in water becoming prematurely unsuitable for industrial reuse;

(g) Inability to recover hydrocarbons in a condition which is suitable directly, or indirectly through gasification processing, as a fuel source for auxiliary electric and thermal energy generation processes to improve large scale operational efficiency, and (h) Inability to recover hydrocarbons in a condition which satisfies prescribed specifications for transportation, pipeline shipment, tank storage or commercial sale, without the need for additional refinement.

SUMMARY OF THE INVENTION

One aspect of one embodiment of the present invention is to provide an improved system and methods for processing combinations of hydrocarbons, water, solids and contaminants, separating the constituent elements and extracting, recovering, filtering and treating any one or more of those constituent elements.

Conveniently, the system and methods provide an abundance of advantages.

One such advantage is that a portable, automated system implementing the methods is capable of continuous processing of a broad spectrum of solids, slurries and fluids to segregate one or more of; (1) recovered hydrocarbons in valuable commercial condition, (2) filtered and treated water suitable for reuse or environmentally sustainable discharge (3) treated dry solids suitable for environmentally sustainable discharge, and (4) extracted contaminants.

A further aspect of one embodiment of the present invention is to provide a modular system for selectively processing, by at least one of separation, extraction, recovery, filtration and treatment, an intake source material containing at least one of; hydrocarbons, water, solids and contaminants and combinations thereof, comprising:

transport means for transporting said intake source material to be treated into said system;

a plurality of discrete inter-connectable modules for said processing of said hydrocarbons, water, solids and contaminants and combinations thereof, said modules each containing one or more means for conducting one or more unit operations for processing said hydrocarbons, water, solids and contaminants and combinations thereof;

sensor and control means for sensing content of said intake source material, directing flow to an appropriate module of said modules and directing flow for processing by unit operations contained in said module; and storage means for storing recovered compounds.

A further aspect of one embodiment of the present invention is to provide a system wherein the processing modules are an oleophilic recovery stage, thermal transfer stage, centrifugal separation stage, solids agitated wash stage, solids elevated wash stage or waste water treatment stage, and the sensor and control means monitoring and governing processing actions are controllable, for example using a programmable logic controller.

A further aspect of one embodiment of the present invention is to provide a system wherein the inter-connectable processing modules are portable modules mounted on a structural framework, mobile trailer, vehicle or marine vessel, alternatively, the system of processing modules comprise a fixed plant.

A further aspect of one embodiment of the present invention is to provide a centrifugal separation stage which includes an apparatus for preventing operational shutdowns caused by solids transportation blockages, by using a solids transfer auger means including sensor and control means for monitoring torque variation and adjusting the rotational speed of said transfer auger.

A further aspect of one embodiment of the present invention is to provide a solids agitated wash stage which includes an apparatus for reducing disintegration of hydratable solids by introducing air or non-reactive gas into an enclosure containing a submerged transfer auger with attached agitation panel means to induce turbulence combined with mechanical agitation of transported solids.

A further aspect of one embodiment of the present invention is to provide a solids agitated wash stage which includes an apparatus for segregated discharge of solids transported by a submerged transfer auger having a progressively increased spiral pitch, surrounded by an enclosure, creating a zone of compressed solids forming a seal retaining fluids while said solids are discharged A further aspect of one embodiment of the present invention is to provide a solids elevated wash stage which includes an apparatus for transporting solids in a positive inclination exposed to water flowing in a counter current direction and having a first weir and second weir in spaced relation directing flow of supernatant hydrocarbons for processing by an oleophilic extraction means.

A further aspect of one embodiment of the present invention is to provide an oleophilic recovery stage which includes an oleophilic apparatus adapted to float in the contents of the decanting tank from which hydrocarbons are to be extracted A further aspect of one embodiment of the present invention is to provide one or more of an oleophilic recovery stage, solids elevated wash stage and solids agitation wash stage which includes an apparatus for oleophilic extraction of hydrocarbons of different viscosities, having an interchangeable collection surface, wherein the collection surfaces is a drum, disc, belt, or brush A further aspect of one embodiment of the present invention is to provide a method for continuous selective processing of an intake source material comprising:

providing an intake source material containing at least one of hydrocarbons, water, solids, contaminants, and combinations thereof;

determining the content of said intake source material to be treated with respect to the nature and concentration of hydrocarbons, water, solids and contaminants;

introducing the intake source material into one or more of a plurality of discrete modules, said modules containing one or more means for conducting one or more operations for processing of the intake source material;

processing the intake source material by at least one of said modules to separate, extract, recover, filter and/or treat at least one of the constituent elements of hydrocarbons, water, solids, and contaminants to form at least one processed stream, said processed stream comprising predominantly, by volume, one of hydrocarbons, water, solids or contaminants;

wherein the selection of the modules into which the material is introduced is based on the content of the intake source material.

In a further aspect of the method, the modules are an oleophilic recovery stage, thermal transfer stage, centrifugal separation stage, solids agitated wash stage, solids elevated wash stage or waste water treatment stage.

In still another aspect, the method further comprises the steps of determining the composition of a processed stream at a first time;

processing said processed stream with unit operations selected based on said composition at said first time;

determining the composition of said processed stream at a second time;

comparing the compositions at said first time and said second time to determine if a compositional difference is present and processing said processed stream with second unit operations selected based on said composition at said second time when there is a compositional difference.

A further aspect of one embodiment of the present invention is to provide a method for continuous, selective processing which includes the step of providing sensor and control means for sensing changes in intake source material content and dynamically adjusting processing to accommodate changes in the content of said material.

Another aspect of one embodiment of the present invention is to provide a method for continuous, dynamically adjustable processing of at least one of hydrocarbons, water, solids and contaminants in an intake source material, wherein said processing includes unit operations for at least one of separation, extraction, recovery, filtration and treatment of constituents in said intake source material and wherein the modules are oleophilic recovery, thermal transfer, centrifugal separation, solids agitated wash, solids elevated wash, waste water treatment or combinations thereof.

Yet another aspect of one embodiment of the present invention is to provide a method for processing hydrocarbons having water present, comprising:

providing an intake source material to be processed containing hydrocarbons and water;

separating said hydrocarbons and said water;

recovering said hydrocarbons; and treating said water to remove residual hydrocarbons, solids and contaminants sufficiently to enable reuse or environmentally sustainable discharge of said water.

A still further aspect of one embodiment of the present invention is to provide a method for processing hydrocarbons present in a solids matrix, comprising:

providing a intake source material to be processed containing hydrocarbons and solids;

separating said hydrocarbons and said solids;

recovering said hydrocarbons; and treating said solids to remove residual hydrocarbons, water and contaminants sufficiently to enable environmentally sustainable discharge of said solids.

Another aspect of one embodiment of the present invention is to provide a system for processing hydrocarbons present in an intake source material of solids or water, comprising:

independent modular processing circuits for each of said hydrocarbons present in said solids and said hydrocarbons present in said water, each circuit having predetermined unit operations for effecting separation, extraction and recovery of said solids, water and hydrocarbons, in combination with a waste water treatment circuit for filtration and treatment of any water present in said intake source material to remove residual hydrocarbons, solids and contaminants sufficiently to enable reuse or environmentally sustainable discharge of said water.

Other objects will become apparent from the accompanying disclosure.

BRIEF DESCRIPTION OF THE DRAWINGS

Similar numerals used in the drawings denote similar elements.

DETAILED DESCRIPTION OF THE PREFERRED EMBODIMENTS

Figure 1:
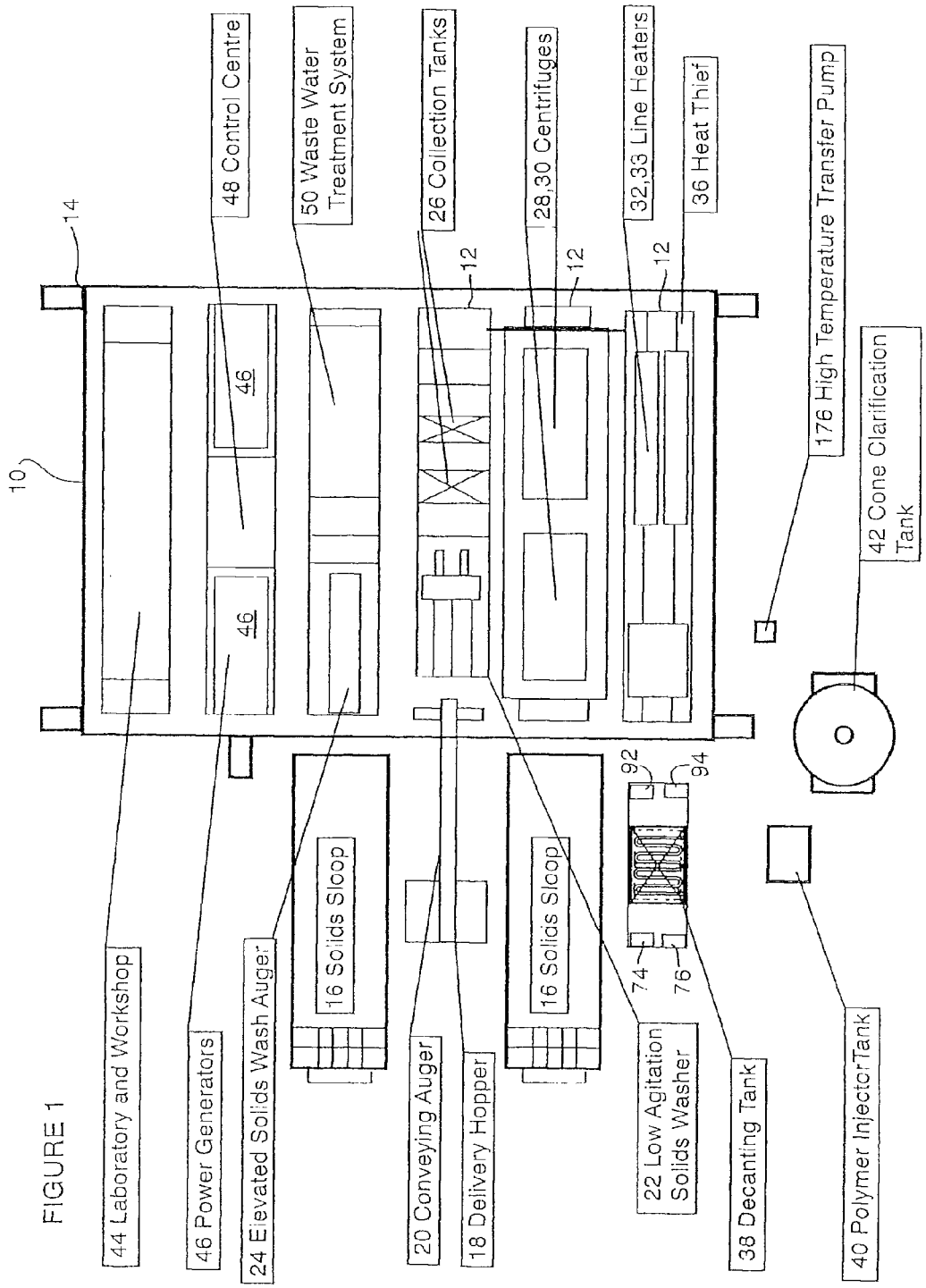
FIG. 1 is the perspective view of one embodiment of the present invention.

In an embodiment of the present invention there is provided a system and method for processing combinations of hydrocarbons, water, solids and contaminants, separating the constituent elements and extracting, recovering, filtering and treating any one or more of those constituent elements.

References to contaminants include, but are not limited to, dissolved solids, naturally occurring compounds, and synthetic additives, and comprise suspended mineral salts, dissolved chlorides, naturally occurring radioactive materials ("NORMs"), ions, chemicals and other substances.

In an aspect of the embodiment the system is capable of processing of a broad spectrum of solids, slurries and fluids to segregate; (1) recovered hydrocarbons in valuable commercial condition, (2) filtered and treated water suitable for reuse or environmentally sustainable discharge (3) treated dry solids suitable for environmentally sustainable discharge, and (4) extracted contaminants.

Valuable hydrocarbons are recovered in a condition which satisfies established specifications for tanker transportation, pipeline insertion and shipment, tank storage, or commercial sale. Accordingly recovered hydrocarbons can be transported directly to storage, a refining plant or to market. The method removes substantially all associated solids and water and recovers hydrocarbons containing less than one percent solid content and less than one percent water content.

Water associated with solids or hydrocarbon slurries or emulsions is separated, filtered and treated. This treated water is returned and is suitable for use in the hydrocarbon recovery and solids washing process in a closed loop, minimizing requirements for fresh water intake and significantly extending the operational lifecycle of process water. Alternatively the water is filtered and treated to a level of purity that satisfies the established specifications regulating the discharge of water into the environment. It will be understood by one of skill in the art that such regulations are established by local governing bodies and may vary by location.

In alternative processes, the majority of unrecovered hydrocarbons remain associated with residual solids. As a result large volumes of solids continue to be characterized as hazardous waste requiring on-site containment facilities and specialized off-site processing and disposal. Systems implementing the method separate and recover the hydrocarbons, leaving residual solids dry and void of hydrocarbons and contaminants. This enables the solids to qualify for non hazardous disposal and also reduces the need for constructing containment facilities for hazardous material, resulting in reduced operating costs and environmental impact. It will be understood by one of skill in the art that a material is suitable for environmentally sustainable discharge if is meets the specifications regulating release of such material established for the location where the material is to be released.

A portable system configuration implementing the method can be deployed to remote sites, relocated between temporary sites, and operated reliably and efficiently in harsh, remote and arid environments. In an emergency, such as an oil spill clean up, a portable system configuration implementing the method with significant processing capacity can be rapidly deployed to and reliably operated at, remote locations.

Systems implementing the method can process materials which are predominately hydrocarbons combined with water, solids and contaminants. Sample applications include, without limitation; marine oil spills, sludge in storage tanks and degraded oil stored in open surface pools in the ground in international locations.

During a marine oil spill, a portable system mounted on a marine vessel located at the spill site can rapidly process large volumes of salvaged salt water contaminated oil into a condition which satisfies prescribed specifications for pipeline insertion and transfer into storage tanks or marine tanker vessels. This provides on site processing, transfer and storage alternatives to inefficient techniques requiring specialized skimming vessels to return frequently to harbor to discharge skimmed contents into a fleet of storage barges pending incineration or disposal. Additionally, if a marine oil spill is skimmed into storage barges, the system can process the contents of the barges and recover the value of the insured hydrocarbon cargo as an alternative to incineration or disposal. Additionally, the same portable system can remediate sand and soil contaminated by the oil spill.

Systems implementing the method can recover the value of hydrocarbons contained in residual sludge in storage tanks and degraded oil stored in surface pools. The system provides a complete integrated approach to processing the pool of stored oil, the residual sludge on the pool bottom and surrounding soil contaminated by hydrocarbon seepage. Water usage is significantly reduced through closed loop water treatment and reuse.

Systems implementing the method can process materials which are predominately solids combined with hydrocarbons, water and contaminants. Sample applications include, without limitation; drilling borehole cuttings contaminated with drilling fluids and produced hydrocarbons which are generated by conventional oil and gas drilling activities, and oilsand in situ production including Steam Assisted Gravity Drainage (SAGD) drilling activities. Additional applications involve sand and soil impacted by marine or land based oil spills and hydrocarbon seepage.

Systems implementing the method in a portable configuration can be transported to remote sites where hydrocarbon extraction drilling activities are conducted, relocated between temporary sites, and operated reliably and efficiently in harsh, remote and arid environments. Recovered hydrocarbons may include expensive drilling fluids which can be reused on site. Residual waste solids qualify for non-hazardous management and disposal. Water usage is significantly reduced through closed loop water treatment and reuse.

Systems implementing the method can process materials which are predominately water combined with solids, hydrocarbons and contaminants. Sample applications include, without limitation; water in tailings settlement ponds associated with oilsand mining production containing mature fine tailings solids and residual hydrocarbons, recovered industrial cutting machine lubrication fluids, recovered car wash fluids and surface wastewater associated with drilling activities, refineries, construction sites and industrial plant operations.

After applying a series of portable systems to remediate the fluids, slurries and sludges in an existing tailings settlement pond, a larger capacity fixed plant installation could be constructed to process the waste stream and displace the settlement pond entirely. Recovered residual hydrocarbons could provide a fuel source for on-site generation of electric and thermal energy to improve operating efficiencies. Clean, dry residual solids qualify for non-hazardous management and disposal. Water usage is significantly reduced through closed loop water treatment and reuse.

Systems implementing the method can be used for primary extraction of hydrocarbons. Sample applications include, without limitation, extraction of heavy oil or bitumen from oil sands in circumstances where the segregated ownership, size and location of an oilsand deposit, and limited availability of water does not warrant the cost of building a large fixed plant applying conventional primary extraction processes.

Accordingly, modules of the system may be mounted in portable configurations comprising structural frameworks, mobile trailers, vehicles, or marine vessels, or may be constructed in a fixed plant configuration independently or in combination with an electric energy and/or thermal energy generation plant.

Figure 2:
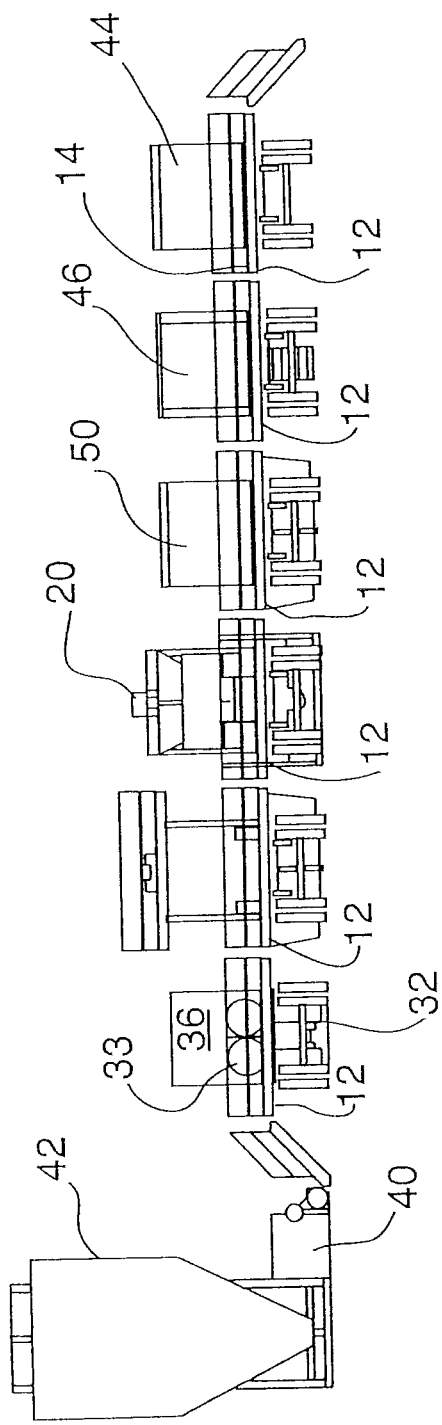
FIG. 2 is a front elevation view of the arrangement shown in FIG. 1.

With reference generally to the Figures, FIG. 1 illustrates one embodiment of the apparatus incorporated in effecting the process. The overall apparatus is globally denoted by number 10. In one possibility, the apparatus 10 can be supported on individual trailers 12, which can be interconnected in parallel relation as shown in FIG. 2. Conveniently, the trailers are wheeled, as shown, to facilitate mobility and rapid development to locations where processing is required.

In FIG. 1, commonly assembled, the individual trailers provide a platform 14 upon which workers (not shown) may access the various stations.

Generally, the arrangement comprises a solids intake delivery hopper 18 with a conveying auger 20. The auger 20 is in communication with a solids agitated wash treatment unit 22 which is in communication with a solids elevated wash treatment unit 24. Recovered solids are discharged into a pair of sloops 16. The arrangement also includes water and hydrocarbons intake pumps 74 and 76 respectively which deliver an intake stream into a decanting tank 38. Pumps 92 and 94 transfer the stream through the heat thief 36 to heaters 32 and 33 respectively, then to centrifuges 28 and 30, respectively. A high temperature transfer pump 176 returns hot hydrocarbons through heat exchangers in the heat thief and decanting tank. Collection tanks 26 receive recovered wastewater and hydrocarbons. Wastewater is passed through water clarification tank 42 and a polymer injection unit 40 is positioned generally adjacent to the clarification tank.

In order to effect operation of the arrangement, the system includes a laboratory and workshop 44 as well as electric power generation units 46 and a control center 48. In order to filter and treat water to enable reuse, and environmentally sustainable discharge, the system further includes a wastewater treatment system 50. The wastewater treatment system 50 is the subject matter of Applicant's co-pending U.S. Application 61/353,270, the contents of which are incorporated herein by reference.

Figure 3:
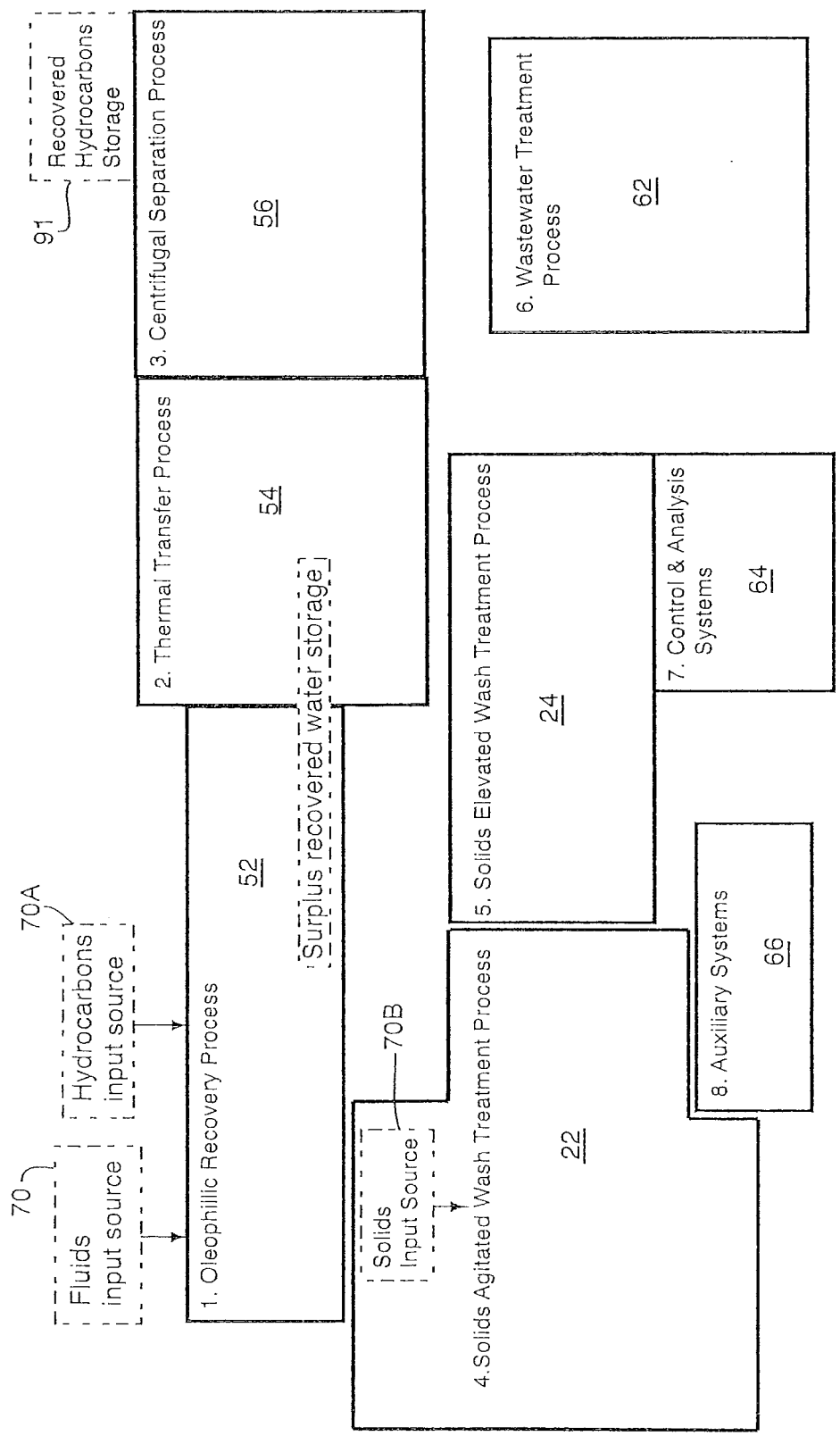
FIG. 3 is a systematic illustration showing the distinct global unit operations involved in the processing of all of the operations typically involved in the system.

FIG. 3 illustrates a schematic depiction of the generic overall processes capable of being conducted with the apparatus as illustrated in FIG. 1. Shown schematically are the three types of possible intake streams, the respective contents of which are predominately water 70, hydrocarbons 70A and solids 70 B (specifically referenced in FIGS. 4, 5 and 6, respectively).

In FIG. 3, there are essentially several discrete global operations as follows; an oleophilic recovery process 52, thermal transfer process 54, centrifugal separation process 56, solids agitated wash treatment process 22, solids elevated wash treatment process 24; and wastewater treatment process 62.

The centrifugal separation process stage 56 includes an apparatus for preventing operational shutdowns caused by blockages of solids transported into the solids agitated wash treatment process stage 22, comprising a solids transfer auger means 140 including sensor and control means for monitoring torque variation and adjusting the rotational speed of said transfer auger.

Figure 12:
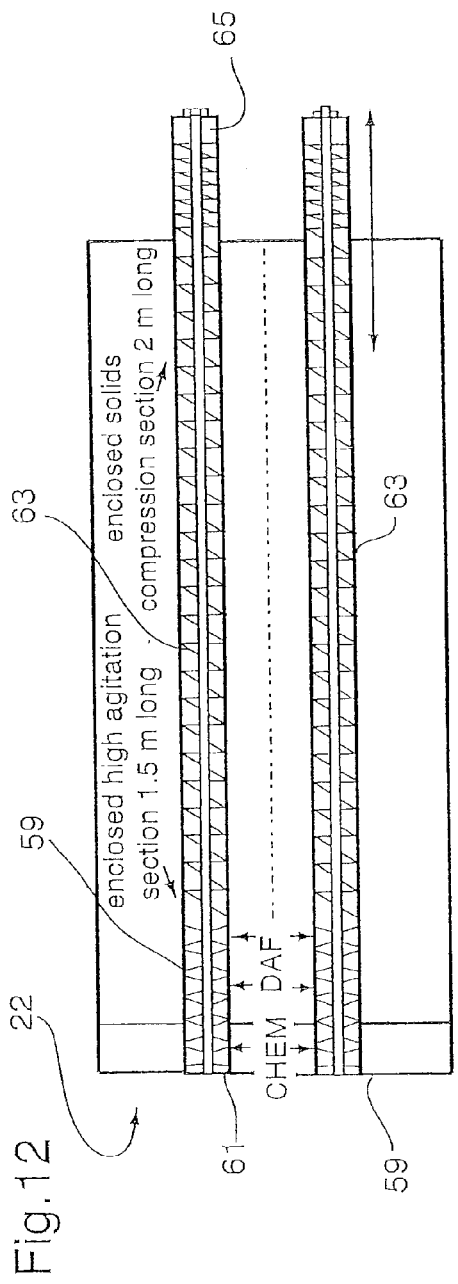
FIG. 12 is a plan view of the agitation washer.
Figure 13:
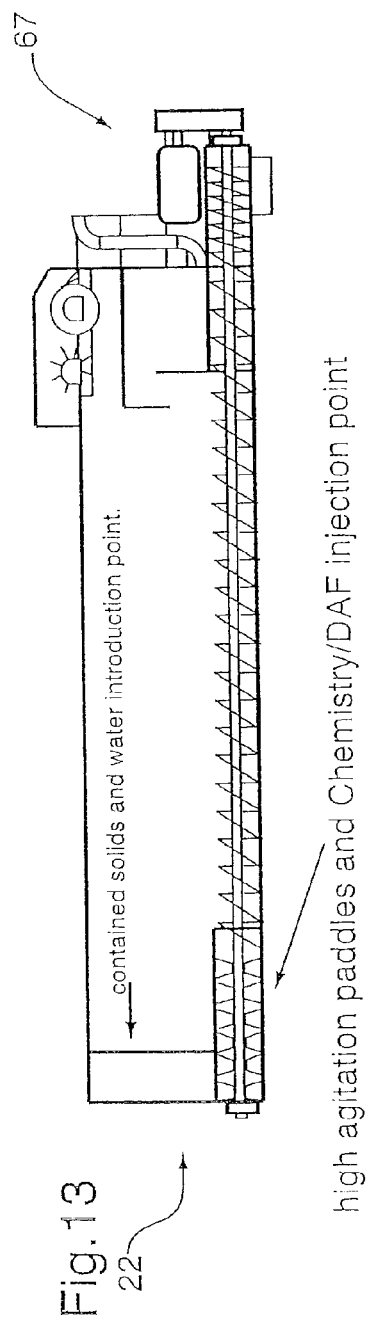
FIG. 13 is a side view of FIG. 12.

The solids agitated wash treatment process stage 22 includes an apparatus illustrated in FIGS. 12 and 13 for reducing disintegration of hydratable solids caused by excessive agitation, by introducing air or non-reactive gas into an enclosure 59 containing a submerged transfer auger with attached agitation panel means 61 to induce turbulence combined with mechanical agitation of transported solids.

The solids agitated wash treatment process stage 22 further includes an apparatus illustrated in FIGS. 12 and 13 for segregated discharge of immersed solids transported by a submerged transfer auger 63 having a progressively increased spiral pitch, surrounded by an enclosure 65, creating a zone of compressed solids forming a seal retaining fluids while said solids are discharged into the elevated wash treatment process stage 24.

Figure 14:
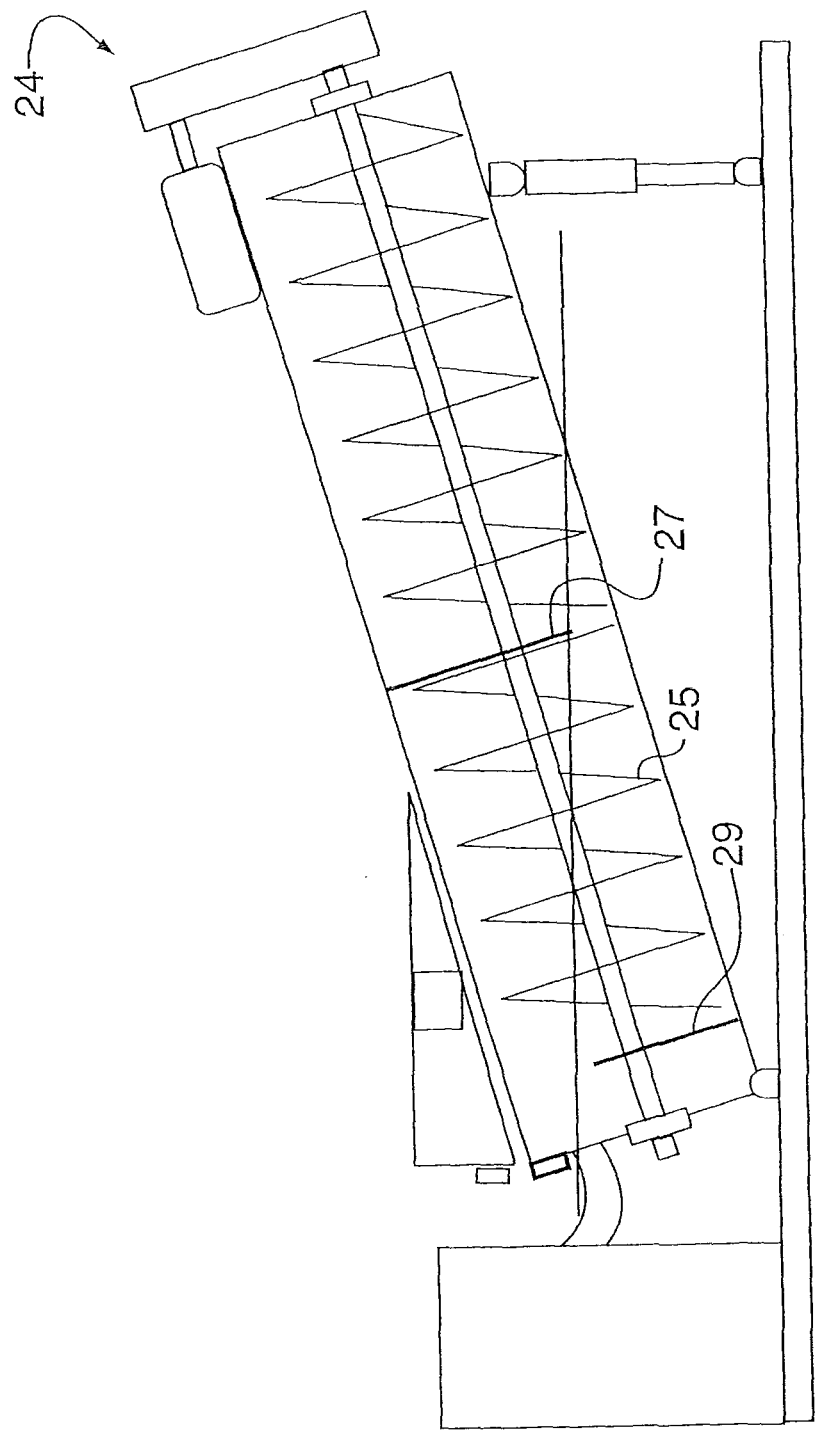
FIG. 14 is a longitudinal section view of the inclined wash auger.

The solids elevated wash treatment process stage 24, includes an apparatus illustrated in FIG. 14 for transporting solids in a positive inclination 25 exposed to water flowing in a counter current direction and having a first weir 27 and second weir 29 in spaced relation directing flow of supernatant hydrocarbons for processing by an oleophilic extraction means.

The oleophilic recovery process stage 52 includes an oleophilic hydrocarbon collection apparatus 80 adapted to float in the contents of the decanting tank 72 from which hydrocarbons are to be extracted Each of the oleophilic recovery process stage 52, the solids agitated wash treatment process stage 22 and the solids elevated wash treatment process stage 24 includes an apparatus 80, 142 and 160 respectively for oleophilic extraction of hydrocarbons of different viscosities, having an interchangeable collection surface selected from a group consisting of a drum, disc, belt, and brush In FIG. 3, there are additional control and analysis systems 64 which are involved in the automation and management of the processes mentioned above as well as auxiliary systems 66 which are useful to augment those processes.

Figure 4:
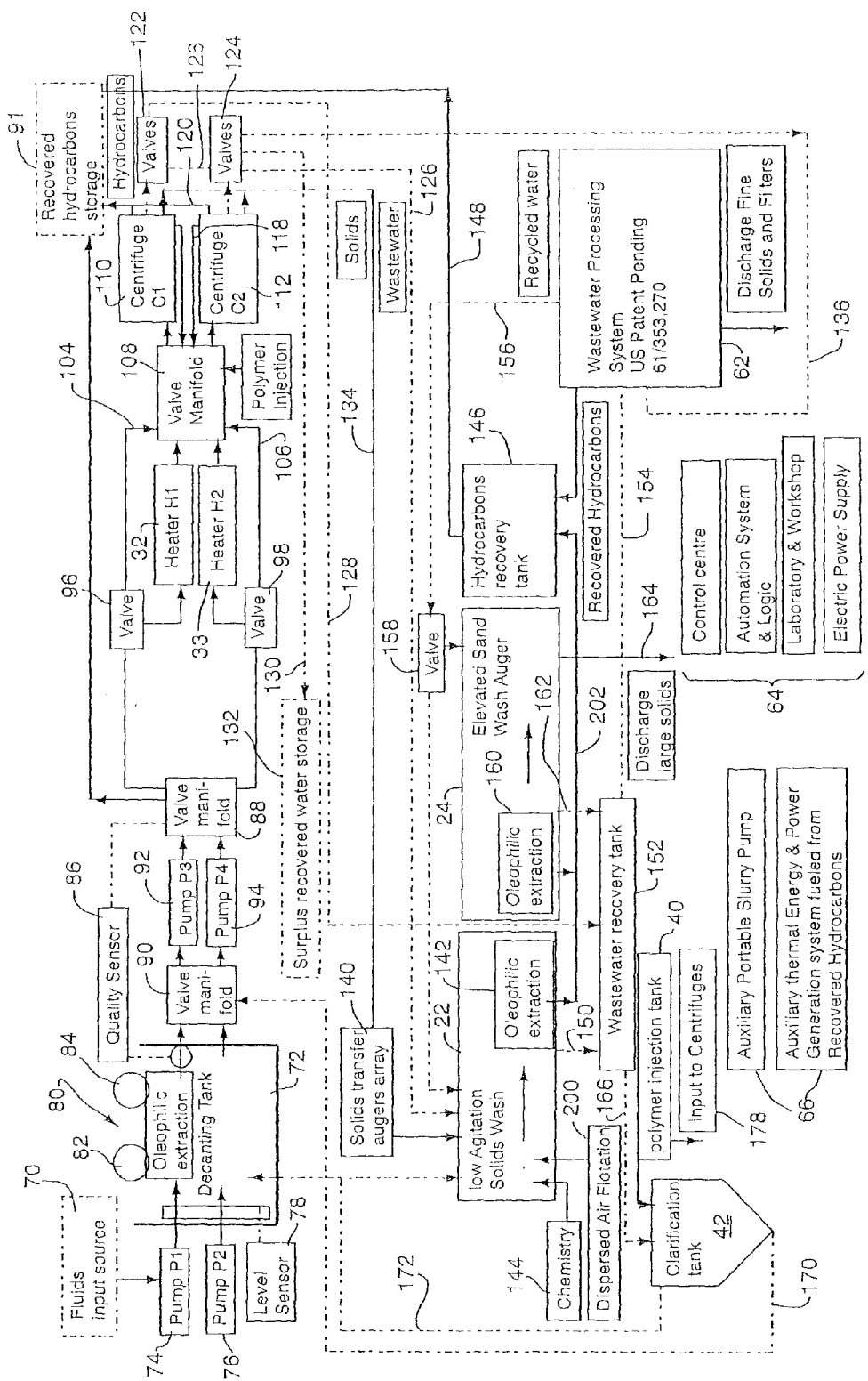
FIG. 4 is a flow diagram illustrating the unit operations involved in the intake and processing of an input stream composed predominately of water.

FIG. 4 illustrates a processing technique where the input source 70 is predominately comprised of water. FIG. 4 reveals greater details concerning the operations involved in the discrete unit operations noted with respect to FIG. 3.

Initially, a source of fluid 70 is introduced into the oleophilic recovery process 52. That process 52 includes pumping the fluid intake stream from source 70, which may contain hydrocarbons, solids and contaminants within a source of water into a decanting tank 72 by at least one pump 74. In the example, a second pump 76 is shown. The decanting tank 72 includes a level sensor 78 for detecting the level of the fluid within tank 72.

Figure 8:
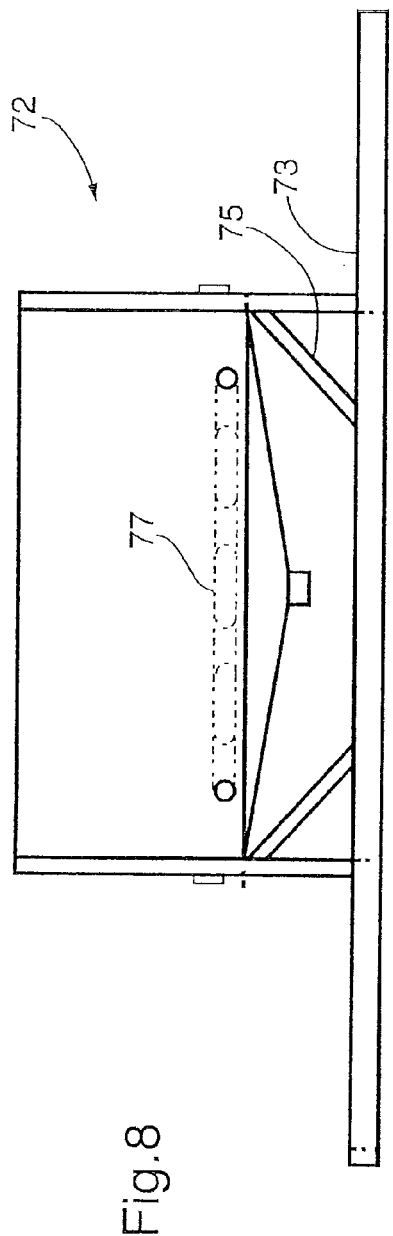
FIG. 8 is an end view of the decanting tank.
Figure 9:
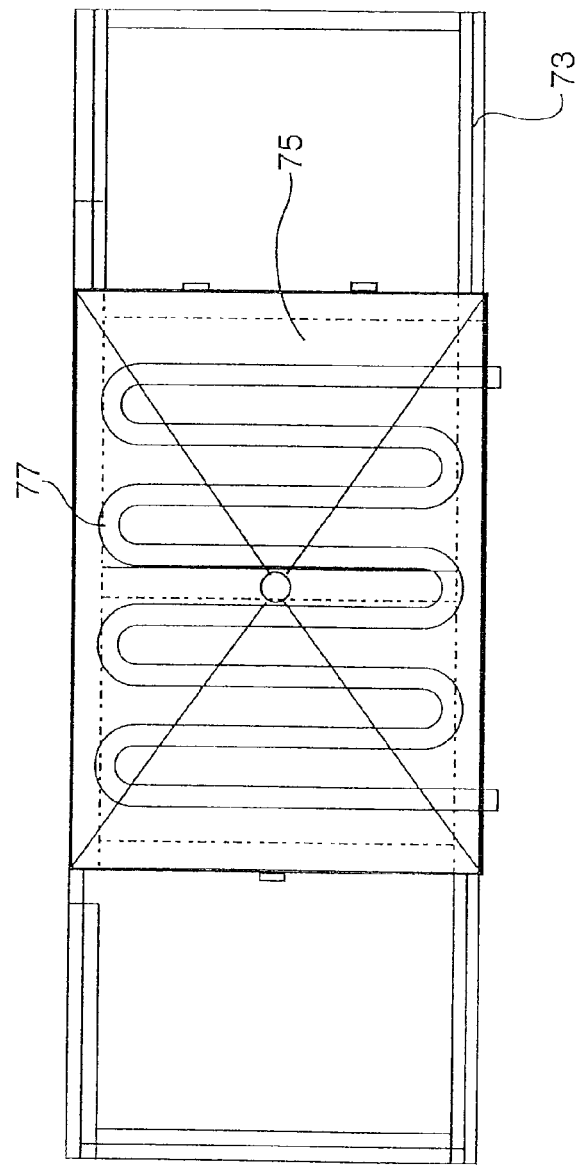
FIG. 9 is an elevation view of the decanting tank.

FIGS. 8 and 9 illustrate the decanting tank 72 in greater detail. As shown, the tank 72 has a frame 73, downwardly tapered walls 75 and a generally serpentine tube heat exchanger 77 and level sensor 78 supra. This design is effective for phase separation and the settlement and purging of solids that may be present in the intake stream.

Additionally, the tank 72 provides for an oleophilic extraction arrangement 80 which floats and adjusts to the level of fluids in the tank. The arrangement comprises moveable oleophilic media of various types for extracting hydrocarbons of different viscosities together with a reservoir for receiving the extracted hydrocarbons. The oleophilic extraction is known from Applicant's co-pending U.S. Patent Application Ser. No. 61/353,270 the contents of which are incorporated herein by reference.

A quality sensor 86 selectively samples hydrocarbons extracted from the decanting tank 72 with a view to determining whether further processing is required (discussed later in the document) or whether the extracted hydrocarbons are of a satisfactory quality that they can be transferred through valve manifold 90 through pump 92 to valve manifold 88 and on to a storage area 91. In the event that further processing of extracted hydrocarbons or fluids in decanting tank 72 are required, valve manifold 90 is connected to transfer pumps 92 and 94 and subsequently through valve manifold 88 to further thermal transfer processing and centrifugal separation processing.

FIG. 3, illustrates that the next stage of global unit operations is directed to the thermal transfer process 54 (FIG. 3). The thermal transfer process 54 is useful to enhance the separation of constituent elements and emulsions in the stream. Valve manifold 88 communicates with two supplemental valves 96, 98, each valve 96, 98 being in fluid communication with a heater 32, 33, respectively. As is evident from FIG. 4, the stream being processed can bypass heaters 32 and 33 by circuits 104 and 106 respectively, to enter valve manifold 108.

At this point, the material is then exposed to the centrifugal separation process 56 (FIG. 3).

In the centrifugal separation stage, a pair of centrifuges 110, 112 are in fluid communication with valve manifold 108 to receive the material to be centrifuged. In order to further assist in the separation of water, solids and hydrocarbons, polymer phase coagulant, flocculent and pH adjustment chemicals injected from polymer injection tank 40 through circuit 178 to valve manifold 108 may be included prior to the material being introduced into centrifuges 110 and 112. Each centrifuge 110 and 112 has a parallel or series circulation circuit 116 and 118, respectively to enable multi-stage sequential series centrifugal processing or single stage segregated parallel centrifugal processing. At least one of the centrifuges 110, 112 will have a fluid connection 120 to the hydrocarbons storage area 91 as is illustrated in the Figure. The fluid continuing to be processed can then be passed through valves 122 and 124 associated with centrifuges 110, 112, respectively. At this stage of the processing, each one of the valves 122 and 124 provides a fluid circuit 126 which sends water to the solids agitated wash treatment process 22 (discussed in this document later). Valve 122 also provides a circuit 128 for passing wastewater from the feed into a recovery tank (152) as shown in the drawing and which will be discussed later in this document. Valve 124 is in fluid communication via circuit 130 to a surplus water storage area 132. Valve 124 is also in fluid communication via circuit 136 to the wastewater treatment process 62 for further processing of the wastewater passing through the system. Both centrifuges 110 and 112 also include a solids transfer circuit 134 to the solids agitated wash treatment process 22.

The solids agitated wash treatment process 22 shown in FIG. 3 includes an array of transfer augers 140 which is in communication with circuit 134 prior to the introduction of water into the solids agitated wash treatment process 22. The torque variation of the solids transfer augers 140 is monitored and its rotational speed adjusted to prevent operational shutdowns caused by blockages at the location where solids enter the solids agitated wash treatment process 22.

Circuit 126 feeds water into the solids agitated wash treatment process 22 as previously indicated. Within the solids agitated wash treatment process there is an oleophilic extraction arrangement 142 similar to that previously discussed as numeral 80. A similar function to that noted above is conducted by the oleophilic extraction arrangement 142.

The solids agitated wash treatment process 22 is additionally augmented using suitable chemical additives noted as "chemistry" 144. This will be readily apparent to those skilled in the art, but can comprise the addition of surfactants, coagulants, flocculating agents, chelating agents, precipitation compounds inter alia. Further, dispersed air or non-reactive gas 200 is introduced into an enclosed area to create turbulent agitation for the purpose of removing hydrocarbons from submerged solids as is known to those skilled in the art. FIGS. 12 and 13 illustrate an example of the wash process structural points. The wash process or stage provides for laterally spaced and isolated augers 63. Initially, as a feed stream enters the stage 22, high agitation paddles 51 connected to the augers 63 commingle any chemical additives with the solids and water feed stream, and mechanically agitate the submerged solids.

Once mixed and agitated, the modified feed stream is transported by the submerged augers 63 through a tank containing water to an enclosed solids compression zone 65, where the solids are consolidated and discharged for further processing. Numeral 67 designates the control devices for controlling the rotation speed and other operating characteristics of the augers.

Hydrocarbons recovered from the oleophilic extraction process 142 may be collected via circuit 202 into hydrocarbons recovery tank 146 and subsequently via circuit 148 to the recovered hydrocarbon storage area 91 as previously discussed.

Wastewater from the solids agitated wash treatment process 22 may be transferred via circuit 150 to wastewater recovery tank 152 and subsequently through circuit 166 to clarification tank 42. Water collected in recovery tank 152 may also be subsequently transferred via circuit 154 to the wastewater processing system 62. As a further benefit, there is provided a circuit 156 which extends from the wastewater processing system 62 through to a valve 158 for returning treated water to the solids agitated wash treatment process 22.

Turning to the solids elevated wash treatment process 24, a feed stream may then be passed from the solids agitated wash treatment stage into this group of unit operations in the process. FIG. 14 illustrates a cross section of the auger 25 which has an upper 27 and lower 29 weir panel in spaced relation. It has been found that the use of the weirs 27, 29 is particularly effective for isolating hydrocarbons floating on the surface of water in which the lower end of auger 25 is submerged and enhancing the washing and rinsing of solids passing through the circuit of the auger 25.

Similar to stage 22, this stage 24 also includes an oleophilic extraction arrangement 124 for the extraction of hydrocarbons. Any hydrocarbons extracted can be discharged through circuit 202 to hydrocarbons recovery tank 146 in a similar manner to that disclosed for stage 22. Wastewater from the solids elevated wash treatment process can be transferred via line 162 to the wastewater recovery tank 152. Water collected in recovery tank 152 may also be subsequently transferred via circuit 154 to the wastewater processing system 62. As a further benefit, there is provided a circuit 156 which extends from the wastewater processing system 62 through to a valve 158 for returning treated water to stage 24. At the completion of stage 24, large solids can be discharged at 164.

Returning to wastewater recovery tank 152, the tank is in communication with clarification tank 42 by circuit 166. In order to clarify the wastewater within clarification tank 42, there is also provided a polymer injection tank 40 which introduces polymer phase coagulant, flocculent and pH adjustment chemicals to effect a clarification process as is well known to those skilled to the art. Chemicals can also be transferred from the polymer injection tank 40 by circuit 178 to valve manifold 108 for injection as an input into centrifuges 110 and 112.

Following polymer injection and clarification of the contents of clarification tank 42, the turbid fluid discharge from the bottom of clarification tank 42, can be transferred via circuit 170 to valve manifold 90 for further processing. The clarified wastewater from the top of clarification tank 42 can be transferred via circuit 172 to either the solids agitated wash treatment process 22 or returned into decanting tank 72 for purposes of makeup water.

Figure 5:
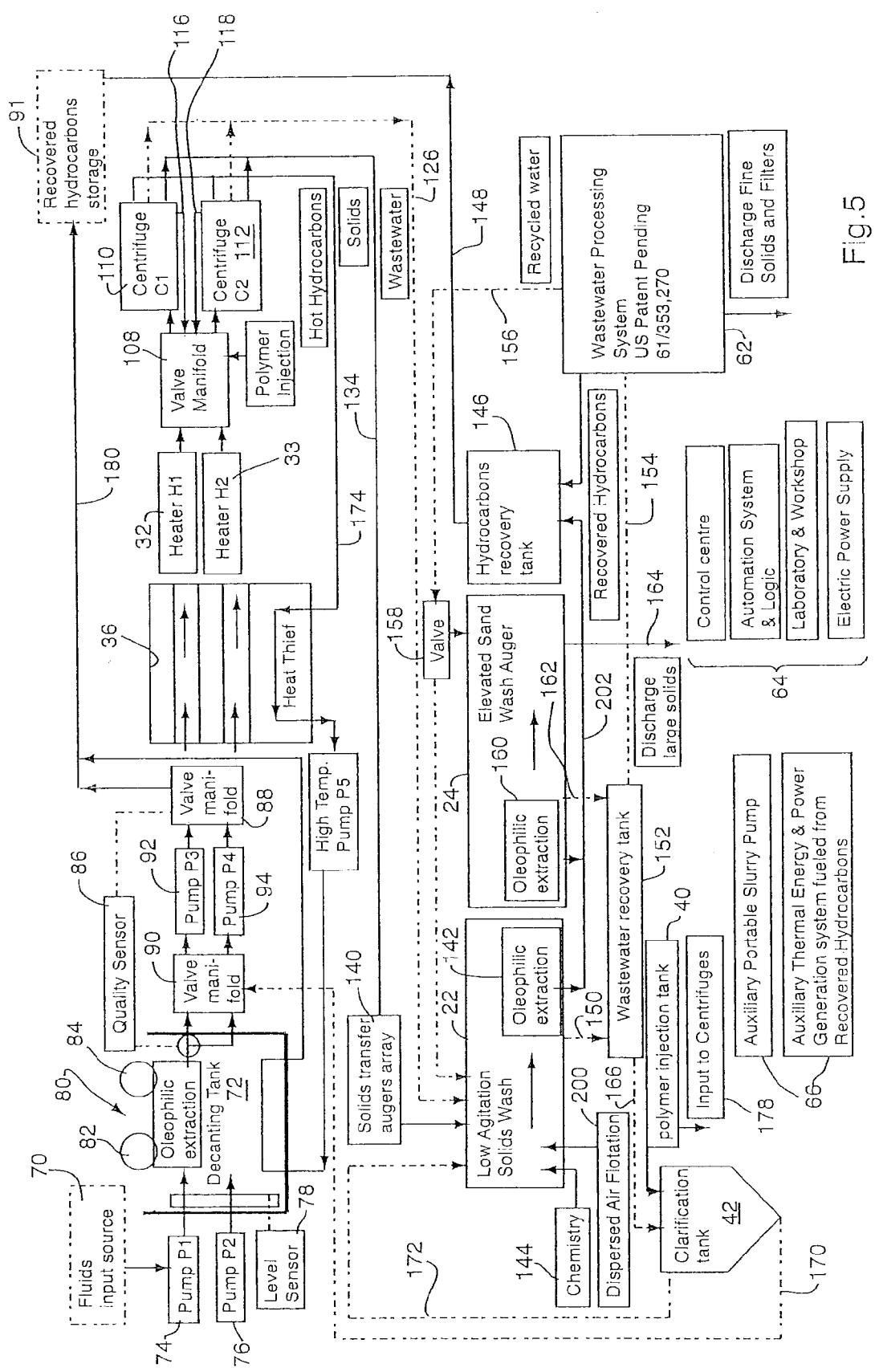
FIG. 5 is a flow diagram illustrating the unit operations involved in the intake and processing of an input stream composed predominately of hydrocarbons.

FIG. 5, illustrates a processing technique where the input source 70 A is predominately comprised of hydrocarbons. FIG. 5 reveals greater details concerning the operations involved in the discrete unit operations noted with respect to FIG. 3. Similar operations are effected from the water processing input source disclosed in FIG. 4.

Accordingly, like numerals will be employed for similar unit operations.

Figure 10:
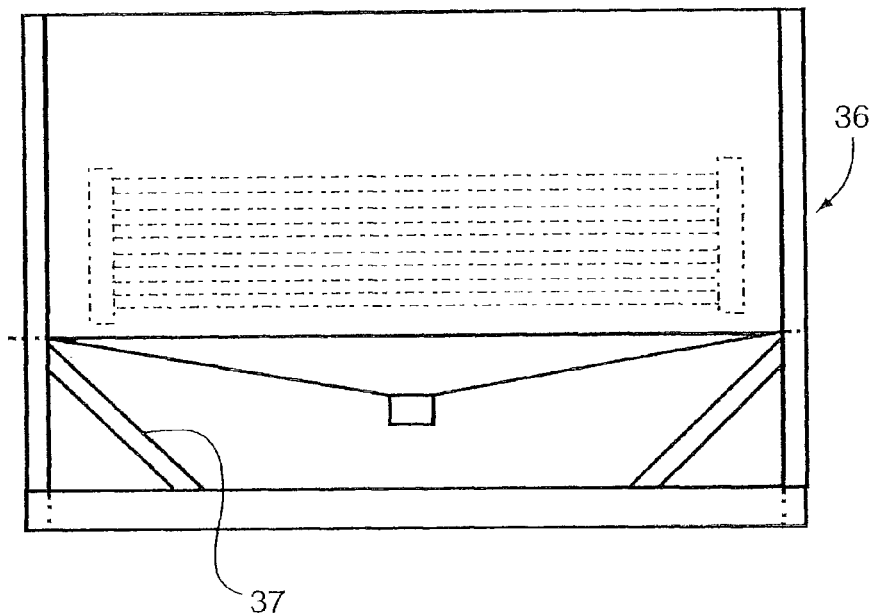
FIG. 10 is an elevation view of the thermal unit (Heat Thief)
Figure 11:
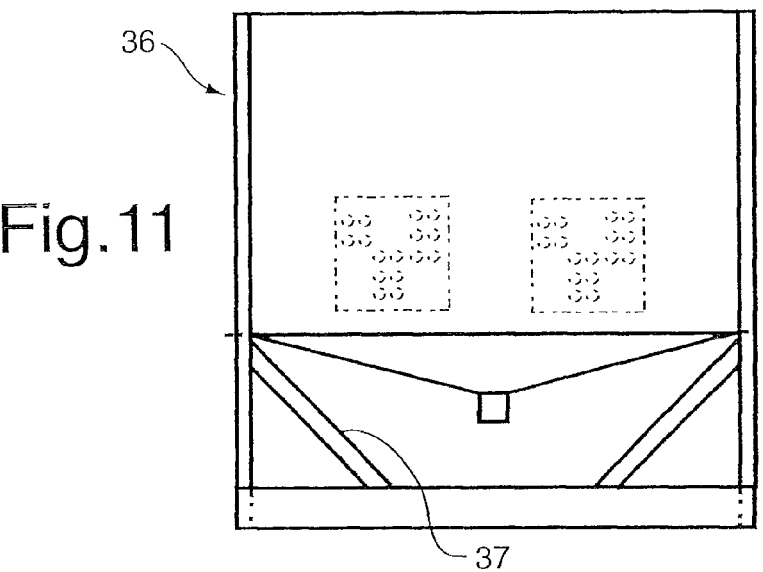
FIG. 11 is an end view of FIG. 10.

In this embodiment, the heat thief 36, shown in FIGS. 1 and 2 is incorporated into the circuit and is positioned in advance of heaters 32 and 33. FIGS. 10 and 11 provide detailed views of the heat thief 36. Essentially, the arrangement provides downwardly tapering walls 37 and a plurality of clustered tube heat exchangers 39. Similar to the discussion regarding the decanting tank 72, the tapered walls 37, assist with separation during processing.

Returning to FIG. 5, hot hydrocarbons resulting from the centrifuges 110 and 112 may be re-circulated through circuit 174 into the heat thief 36 and then subsequently pumped by pump 176 through a heat exchanger in the decanting tank 72. A closed circuit returns the hydrocarbons via circuit line 180 to the recovered hydrocarbons storage area 91. The solids and the wastewater are handled in a similar manner to that which was discussed concerning FIG. 4. With the solids being handled in circuit 134 and the wastewater via circuit 126.

Figure 6:
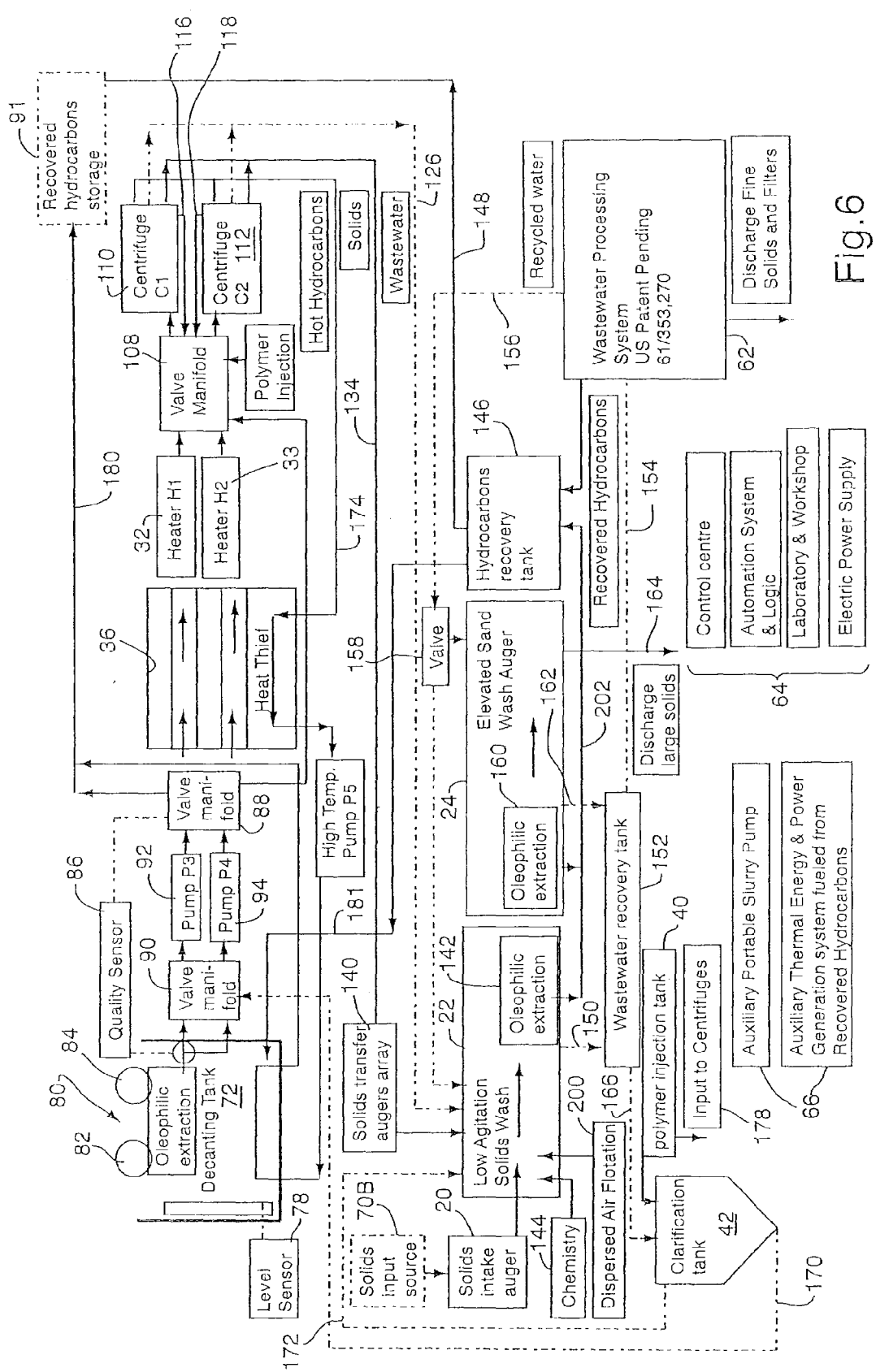
FIG. 6 is a flow diagram illustrating the operations involved in the intake and processing of an input stream composed predominately of solids.

FIG. 6, illustrates a processing technique where the input source 70 B is predominately comprised of solids. FIG. 6 reveals greater details concerning the operations involved in the discrete unit operations noted with respect to FIG. 3. As illustrated in FIG. 6, the solids input source 70 B is in communication with a solids intake auger referenced by numeral 20 and shown in FIGS. 1 and 2. The collected solid material is then transferred into the solids agitated wash treatment processing operations generally referenced by numeral 22.

In this embodiment, the hydrocarbons recovery tank 146 is in communication by circuit 181 with the decanting tank 72.

In each instance, namely the fluids intake and processing protocol as depicted in FIG. 4, the hydrocarbons intake and processing protocol shown in FIG. 5 or the solids intake and processing protocol shown in FIG. 6, the system is designed to provide unit operations which attend to the separation of each one of the hydrocarbons, water, solids and contaminants for extraction, recovery, filtration and treatment.

The overall arrangement is also scalable and can be augmented with parallel arrangements of each and every one of the units shown in FIGS. 4 through 6. In this manner, the overall methodology affords the separation and recovery, filtration and treatment of any volume of material.

Figure 7:
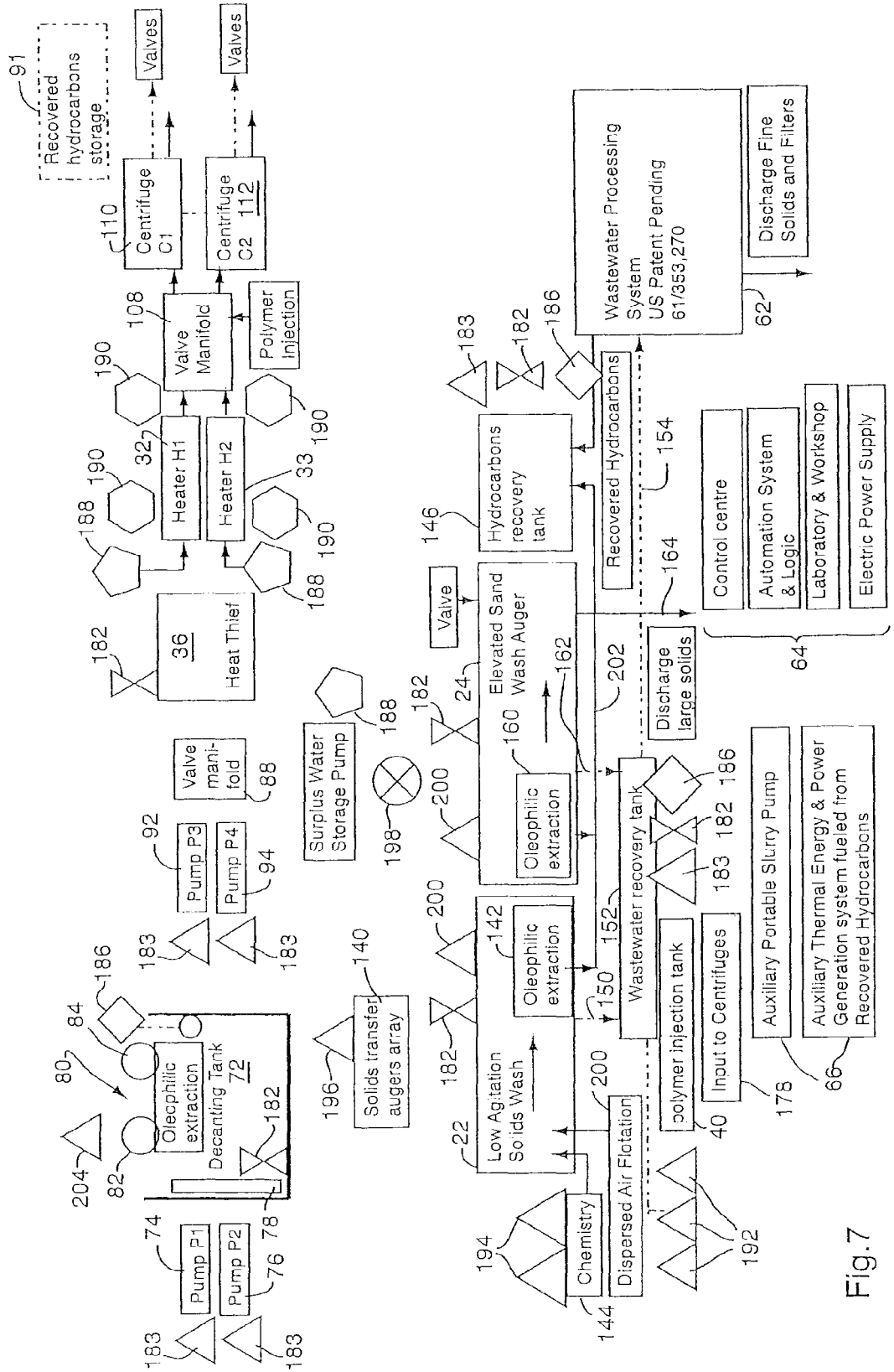
FIG. 7 is a schematic view of the automation sensors layout.

Referring now to FIG. 7, shown is a schematic layout of the automation sensors typically associated with the overall system. As is illustrated, suitable pumps designated by numerals 74 and 76, which may comprise, for example, 30 horsepower variable speed controlled pumps act to work with the level indicator 78, shown best in FIG. 4 to ensure that all tank levels maintain optimum working levels. These also adjust the feed stream to the system in conjunction with the feed stock in volumes of hydrocarbons being processed. The sensors for the pumps are designated by numeral 183.

The water-oil combination level sensors are designated by numeral 182. These sensors provide the operators with a visual indication of the volumes of oil and water in each tank further suitable for operation of the pumps, oleophilic systems and/or power to the heat exchangers.

Turning to the oil/water analytical sensors, these are designated by numeral 186. These provide the precise percentages of oil to water ratios for determining the minute-by-minute quality characteristics of recovered hydrocarbons. When compositional differences are detected from time to time, the stream may be exposed to other unit operations to accommodate the change.

The electrostatic flow meters are designated by numeral 188. These measure the input and discharge levels of hydrocarbons and water.

The thermocouples, designated by numeral 190, are provided to measure the input and output of the controlled heating process and communicate with the Programmable Logic Controller (PLC) and Silicon Controlled Rectifier (CSR) to regulate power to the heaters 32 and 33.

Two horsepower variable speed drive motors for injection of coagulant and flocculent from the polymer injection tank 40 are designated by numeral 192 and are controlled by the operator via the PLC. Two horsepower variable speed drive motors 194 are provided for the optional injection of surfactant or water-drop chemistry for the solid agitated wash treatment process 22. This, once again, is controlled by the operator via the PLC.

The 30 horsepower variable speed motors for the transfer auger drives 140 are designated by numeral 196. The speed will be set by the volumes of solids being fed to the system, volumes of discharge from the centrifuges and the required speeds for the solids agitated wash treatment augers and solids elevated wash treatment augers. The augers will also have a high torque threshold that when exceeded will produce increased rotational speed to avoid an overload condition which could cause a shutdown and create a blockage.

A lower explosion level (LEL) monitor which measures gas and air quality in the working environment is designated by numeral 198.

Finally, numeral 204 designates two horsepower variable speed drives for the oleophilic systems which communicate with the PLC and oil and water level sensors to ensure that the drums of the oleophilic systems are removing the optimum amount of hydrocarbons for purposes of efficiency.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

We claim:

1. A method for continuous selective processing of an intake source material comprising:

obtaining an intake source material containing predominately solids, the intake source material having been formed from an input material by heating and applying a centrifugal separation process to the input material to initially separate solids, hydrocarbons, and water, the solids forming the intake source material comprising remaining residual hydrocarbons and contaminants to be removed from the solids;

introducing the intake source material into a solids agitated wash stage to separate hydrocarbons and contaminants from the solids;

processing the intake source material in the solids agitated wash stage to reduce disintegration of hydratable solids caused by excessive agitation, by introducing air or non-reactive gas into an enclosure containing at least one agitation panel followed by a submerged transfer auger and a solids compression, consolidation and discharge auger to form a first processed stream, said first processed stream comprising predominantly solids;

introducing the first processed stream into a solids elevated wash stage to clean solids in the first processed stream and further remove hydrocarbons and contaminants from the solids;

processing the first processed stream in the solids elevated wash stage using an apparatus for transporting solids in a positive inclination exposed to water flowing in a counter current direction and having a first weir and a second weir in spaced relation directing flow of supernatant hydrocarbons for Processing by an oleophilic extraction stage, and forming a second processed stream comprising rinsed solids; and discharging the rinsed solids.

2. The method as set forth in claim 1, further including a water treatment stage for rendering water separated from the first or second processed streams suitable for reuse or environmentally sustainable discharge.

3. The method as set forth in claim 1, further comprising sensing changes in said intake source material and dynamically adjusting processing to accommodate changes in the content of said material.

4. The method as set forth in claim 1 further comprising providing an oleophilic recovery stage, a thermal transfer stage, a centrifugal separation stage, and a waste water treatment stage.

5. The method according to claim 1 further comprising:
determining a composition of the first or second processed stream at a first time;
processing said first or second processed stream with unit operations selected based on said composition at said first time; and
determining a composition of said first or second processed stream at a second time; and
comparing the compositions at said first time and said second time to determine if a compositional difference is present and processing said first or second processed stream with second unit operations selected based on said composition at said second time when there is a compositional difference.

6. The method as set forth in claim 5, wherein said processing comprises unit operations for separation, extraction, recovery, filtration and treatment of constituents in said first or second processed stream.

7. The method as set forth in claim 1, wherein said discharge auger has a progressively increased spiral pitch, and is surrounded by an enclosure, creating a zone of compressed solids forming a seal retaining fluids while said solids are discharged.

8. The method as set forth in claim 1, wherein the stages are provided using portable modules deployable to remote sites.

9. The method as set forth in claim 2, further comprising using at least some water processed by the water treatment stage in performing the method.

* * * * *